Oct. 18, 1960  S. KUCKIEWICZ  2,956,364
FISH LURE WITH SHIELDED SNAPPING HOOK
Filed March 7, 1956
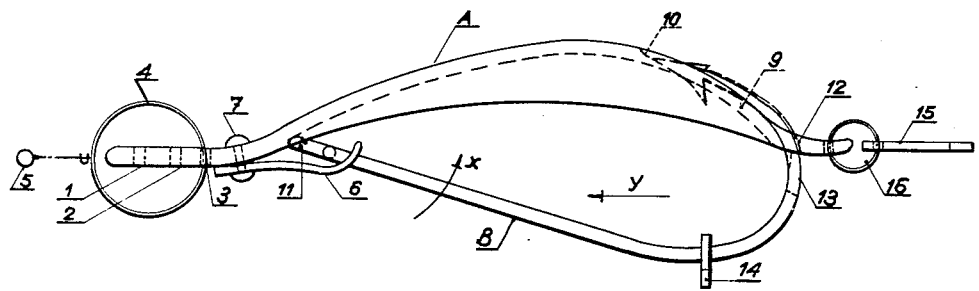
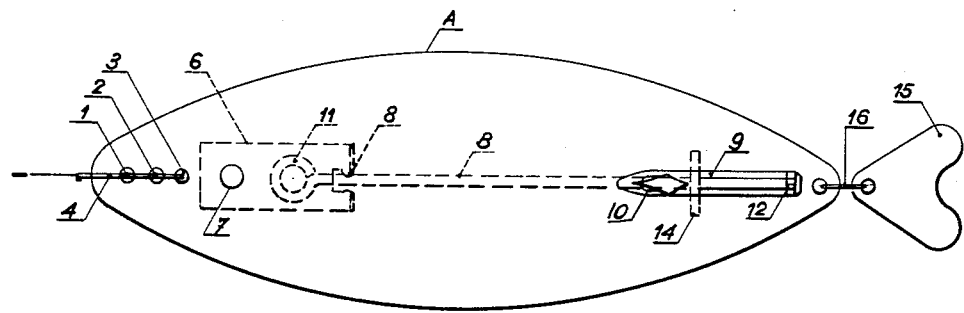
INVENTOR:
Stanislao Kuckiewicz
BY:
Michael S. Struker
agt.

United States Patent Office 2,956,364
Patented Oct. 18, 1960

2,956,364
FISH LURE WITH SHIELDED SNAPPING HOOK

Stanislao Kuckiewicz, Piazza Diaz 1, Milan, Italy

Filed Mar. 7, 1956, Ser. No. 570,033

Claims priority, application Italy July 22, 1955

4 Claims. (Cl. 43—42.04)

The present invention relates to a fish lure. More particularly, the invention relates to a fish lure or an artificial fishing bait having a shielded, automatically snapping hook.

In accordance with a preferred embodiment of the invention, a fish lure comprises a shaped body or support plate constituting the bait and a bait connected hook held in such a position that at least the pointed end of the hook is shielded by the bait body and snaps into operative position under the pressure of the fish jaws at the instant of biting.

In order that the invention may be readily carried into effect, it will now be described with reference to the accompanying drawing, wherein:

Fig. 1 is a side elevation of a preferred embodiment of the fish lure of the present invention; and Fig. 2 is a top plan view of the embodiment of Fig. 1.

In Figs. 1 and 2, A indicates the bait body or support plate, made of metal sheet shaped into an elliptoid (spoon) form whose inner surface is concave and the outer surface convex. In its forward portion, spaced along its longitudinal axis, are three aligned holes 1, 2, 3 with one of which cooperates a removable ring 4 having an eyelet 5 for hitching to the fishing line. The portion of the support plate located ahead of the hole (1, 2, 3) to which the line is connected acts in fact as a front directional rudder, upon the extent of which the intensity of the deviation, oscillation, undulation and rotation of the bait axis is dependent and this movement of the bait may be changed by selecting one of the holes for connection to the trolling line. The area of the directional rudder is obviously dependent on the distance between the front end of the support plate and the hole (1, 2, 3) wherein the removable ring 4 is engaged (which will, of course, have a sufficient diameter to permit the free movements of the forward portion of said support plate).

The directional rudder as thus defined preserves full freedom of movement inside the removable ring 4 and is enabled to assume different angles with respect to the direction of trolling, being, therefore, submitted to the dynamical action of the water over either face, thus realizing broad deviations in different directions.

A flat spring 6 is attached at its front portion to the inner side of the support plate or bait A by means of a rivet or screw 7 in proximity to the hole 3. The free end of the spring 6 is arched in the direction of the support plate and presents there a partially closed center slot 8 in which the shank portion of the hook body B is arranged and held. In the rear portion of the support plate a longitudinal, elongated slot or aperture 9 is formed, of which the width is sufficient to let the hook B through. Corresponding with the front end of the slot 9 a depression 10 is provided, which is suitable for containing, along the outer convex surface of the supporting plate, the hook point shielded in the said depression and resting upon its bottom. The ring shaped end 11 of the hook rests against the support plate A above the spring 6, which urges the hook B in the direction of the arrow X with its arched end against the rear end of the slot 9. The rear end of the slot 9 will in fact be in such a position that the maximum extension of the arched or bight portion of the hook B will rest against it without passing through to the other side. The force exerted by the spring 6 in the direction of the arrow X is in any case insufficient to determine the passage of the arched or bight portion of the hook B over the rear end 12 of the slot 9. Such passage would be permitted by a longitudinal displacement of the hook in the direction of the arrow Y, which would require a further lowering of the spring 6, which elastically reacts against such a displacement. A longitudinal displacement of the hook in the direction of the arrow Y is also hindered by the frictional resistances between hook and spring 6 and between ring 11 and internal surface of the support plate.

In the described and illustrated position ("charged" or "cocked" position) the bait is cast and recovered in the baiting phase. At the instant of biting, the fish, gripping between its jaws the center or back portion of the hook, exerts a pressure upon the exposed portion of the hook in the direction of the arrow X until it causes the rearmost arched or bight portion 13 of the hook to pass over the rear end 12 of the slot 9. The rearmost arched portion surpassed, the hook freely continues its travel according to the arrow X pivoting around its eye 11, exposing its point and hooking the fish. The fish endeavouring to free itself, pulls the hook from underneath the spring 6, encountering at first a resistance due to the shape of the spring, which resistance is sufficient to ensure that the hook deeply penetrates into the fish's mouth.

Then the hook, released from the spring 6 runs for nearly its total length freely through the slot 9 until stopped by the ring 14 which is slidably fitted around the hook and has an outer diameter greater than the width of the said slot and an inner diameter smaller than the diameter of the terminal eye 11 of the hook. The bait or support plate is completed by a shaped plate 15 (made of sheet metal, plastic material or other) connected to the rear end of the support plate A by a ring 16 and intended to simulate the tail of a fish. The main advantages gained with the bait according to the present invention are as follows:

(1) The bait, having its point shielded during the baiting action, can be cast and trolled in water encumbered with vegetation and other obstacles (where fish are especially numerous) without any risk of being fouled by said obstacles;

(2) The fish is unaware of the presence of the hook and during the biting does not feel the point right away and resolutely bites the bait, causing the snapping of the hook and a secure hooking;

(3) By placing the ring 4 in the one or another of the holes 1, 2, 3 the fisherman, according to the speed of the current and of the fishing tackle, the kind of fish and his own experience, can impart to the bait a different intensity of alternately undulatory, oscillatory or like movements suitable for the type of bait utilized;

(4) The freed hook, with the fish caught, maintains freedom to rotate and assume various angles of inclination with respect to the water, preventing the unhooking and release of the fish, when the fish and bait are rigidly connected to each other, the fish is frequently released since the struggling fish frees itself from the hook, levering upon the bait itself;

(5) The contrivance, especially suitable for catching large fish, possesses good strength characteristics; the use of a strong common hook, of a single spring for holding the hook in the "charged" or "cocked" position and for actuating the release of the same, of a simply shaped bait, to the exclusion of any complex mechanism.

It is, of course, understood that the particulars of the described device may also vary from the illustrated example without extending beyond the scope of the invention. The support plate or body of the bait may be of any type whatsoever (oscillating, undulating, rotating, artificial fish) and of any suitable material such as metal, plastic material, rubber, wood or the like. The hook may have an enlargement of the hitching end of and type such as a ring, pin, ball or other type. The spring acting upon the hook may also be of a type differing from the illustrated one.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fish lure comprising, in combination, a hook member having a pointed end portion, a shank portion opposite to said end portion, and an intermediate bight portion merging with said pointed end portion and said shank portion; a single support plate having an aperture through which said hook member is movable; and spring means carried by said support plate arranged to slidably engage said hook member for maintaining the same in a cocked position where said pointed hook end portion is located closely adjacent to said support plate and the outer end of said aperture is engaged by said bight portion in such a manner as to resist the pressure of said spring means tending to press said hook member toward said plate and said bight portion being formed in such a manner that a pressure acting only on said hook member and plate moves said bight portion through said aperture sufficiently to allow said spring means to snap the hook member to a position where said pointed end substantially protrudes from said plate.

2. A fish lure comprising, in combination, a hook member having a pointed end portion, a shank portion opposite to said end portion and formed with a releasable terminal head portion, and an intermediate bight portion merging with said pointed end portion and said shank portion; a support plate having an aperture through which said hook member with the exception of said terminal head thereof is movable, said terminal head having a width greater than the width of said aperture and forming a stop means; and spring means carried by said support plate arranged to engage over said releasable terminal head portion of the hook member for maintaining the same in a cocked position where said pointed hook end portion is located closely adjacent to said support plate and the outer end of said aperture is engaged by said bight portion in such a manner as to resist the pressure of said spring means tending to press said hook member toward said plate until a pressure acting on said hook member and plate moves said bight portion through said aperture sufficiently to allow said spring means to snap the hook member to a position where said pointed end substantially protrudes from said plate, with said spring means furthermore arranged to release said terminal head portion of the hook member upon longitudinal pull thereon to allow for sliding movement thereof until stopped by said head portion reaching said aperture.

3. A fish lure comprising, in combination, a hook member having a pointed end portion, a shank portion opposite to said end portion and formed with a terminal head, and an intermediate bight portion merging with said shank portion and with said pointed end portion; an elongated supporting plate for said hook member provided at one end thereof with a longitudinal slotted aperture; a leaf spring having one end fastened to the opposite end portion of said plate with the free end portion of the spring directed toward said slotted aperture in substantial longitudinal alignment therewith, said free end portion of the spring being bifurcated to provide a pair of prong end portions bent toward said plate, said leaf spring being longitudinally spaced from said slotted aperture a distance such as to retain the head of said hook member with the shaft portion thereof lodging between said prong end portions of the spring and slightly longitudinally movable with respect thereto while being urged against said plate by the spring, and said slotted aperture so shaped that said hook member is movable in said aperture in its plane transversal of said plate from a retracted end position with the pointed end portion of the hook member closely adjacent to said plate and said leaf spring urging the bight portion near said pointed end portion into engagement with the outer end of said slotted aperture in such a manner as to resist the pressure of said spring until pressure is applied to said hook member and said plate moving said bight portion sufficiently far through said aperture concurrently with a slight longitudinal displacement of the hook member against said spring to allow said spring to snap the hook member to a position where said pointed end substantially protrudes from said plate, thereafter leaving the hook member to be pulled longitudinally free of the bifurcated end portion of the spring and to be slid to a longitudinally extended position until stopped by said head of the hook member reaching said aperture.

4. A fish lure comprising, in combination, a hook member having a pointed end portion, a shank portion opposite to said shank portion and formed with a terminal head, and an intermediate bight portion merging with said shank portion and with said pointed end portion; an elongate supporting plate for said hook member provided at one end thereof with a longitudinal slotted aperture; a leaf spring having one end fastened to the opposite end portion of said plate with the free end portion of the spring directed toward said slotted aperture in substantial longitudinal alignment therewith, said free end portion of the spring being bifurcated to provide a pair of prong end portions bent toward said plate and urged toward said plate, said leaf spring being longitudinally spaced from said slotted aperture a distance such as to retain the head of said hook member with the shaft portion thereof lodging between said prong end portions of the spring and slightly longitudinally movable with respect thereto while being urged against said plate by the spring, and said slotted aperture so shaped that said hook member is movable in said aperture in its plane transversal of said plate from a retracted end position with the pointed end portion of the hook member closely adjacent to said plate and said leaf spring urging the bight portion near said pointed end portion into engagement with the outer end of said slotted aperture in such a manner as to resist the pressure of said spring until pressure is applied to said hook member and said plate moving said bight portion sufficiently far through said aperture concurrently with a slight longitudinal displacement of the hook member against said spring to allow said spring to snap the hook member to a position where said pointed end substantially protrudes from said plate, thereafter leaving the hook member to be pulled longitudinally free of the bifurcated end portion of the spring and to be slid to a longitudinally extended position until stopped by said head of the hook member reaching said aperture; and a stop ring slidable on said shank portion and providing a bearing adapted to be engaged by said head of the hook member and facilitating the turning thereof about its longitudinal axis.

(References on following page)

References Cited in the file of this patent

UNITED STATES PATENTS

| | | |
|---|---|---|
| 1,987,839 | Moilanen | Jan. 15, 1935 |
| 1,994,168 | Boyko | Mar. 12, 1935 |
| 2,143,631 | Nisses-Gagnér | Jan. 10, 1939 |
| 2,196,555 | Heiman | Apr. 9, 1940 |
| 2,197,209 | Eppinger | Apr. 16, 1940 |
| 2,230,904 | Parkins | Feb. 4, 1941 |
| 2,424,096 | Janchan | July 15, 1947 |
| 2,443,753 | Tusa | June 22, 1948 |
| 2,456,705 | Herring | Dec. 21, 1948 |
| 2,588,400 | McRoberts | Mar. 11, 1952 |
| 2,608,788 | Niemi | Sept. 2, 1952 |
| 2,611,208 | Alexath | Sept. 23, 1952 |